US012782379B2

(12) United States Patent
Nylander

(10) Patent No.: US 12,782,379 B2
(45) Date of Patent: Nov. 3, 2026

(54) WIND SPEED MEASUREMENT

(71) Applicant: TECONER OY, Helsinki (FI)

(72) Inventor: Pauli Nylander, Helsinki (FI)

(73) Assignee: TECONER OY, Helsinki (FI)

( * ) Notice: Subject to any disclaimer, the term of this patent is extended or adjusted under 35 U.S.C. 154(b) by 782 days.

(21) Appl. No.: 17/788,649

(22) PCT Filed: Sep. 22, 2020

(86) PCT No.: PCT/FI2020/050613
§ 371 (c)(1),
(2) Date: Jun. 23, 2022

(87) PCT Pub. No.: WO2022/064095
PCT Pub. Date: Mar. 31, 2022

(65) Prior Publication Data

US 2023/0025547 A1 Jan. 26, 2023

(51) Int. Cl.
*G01P 5/14* (2006.01)
*G01P 1/02* (2006.01)
(Continued)

(52) U.S. Cl.
CPC ................ *G01P 5/14* (2013.01); *G01P 1/026* (2013.01); *G01F 5/00* (2013.01); *Y02A 90/10* (2018.01)

(58) Field of Classification Search
CPC .......... G01P 5/14; G01P 1/026; G01P 21/025; G01P 5/00; G01P 5/16; G01P 5/165;
(Continued)

(56) References Cited

U.S. PATENT DOCUMENTS 3,182,503 A * 5/1965 Corcoran ................ G01P 11/00 708/805
4,920,808 A * 5/1990 Sommer ................... G01P 5/14 73/202.5

(Continued)

FOREIGN PATENT DOCUMENTS

CA 2787259 A1 7/2011
CN 102455367 A 5/2012

(Continued)

OTHER PUBLICATIONS

Justus, C. G., and Amir Mikhail. "Height variation of wind speed and wind distributions statistics." Geophysical research letters 3.5 (1976): 261-264. (Year: 1976).*

(Continued)

*Primary Examiner* — Catherine T. Rastovski
*Assistant Examiner* — Carter W Ferrell
(74) *Attorney, Agent, or Firm* — NIXON & VANDERHYE

(57) ABSTRACT

According to an example embodiment, an apparatus for wind speed measurement is provided, the apparatus comprising: a pressure sensor arranged to provide a pressure sensor signal that is descriptive of an instantaneous air pressure; a wind shield arranged to prevent a direct airflow from the environment of the apparatus to the pressure sensor; and a processing unit for deriving, based on the pressure sensor signal, one or more wind speed characteristics that are descriptive of the wind speed at a predefined reference measurement height.

20 Claims, 4 Drawing Sheets

(51) Int. Cl.
*G01P 5/00* (2006.01)
*G01F 5/00* (2006.01)

(58) Field of Classification Search
CPC ...... G01P 13/02; G01P 13/045; G01P 13/025; G01P 13/0066; G01P 5/02; G01P 1/02; G01W 1/02; G01W 1/00; G01W 1/04; B64D 43/02; G01F 1/002; G01F 1/34; G01D 11/245; G01S 17/95; Y02A 90/10; G01L 9/06
See application file for complete search history.

(56) References Cited

U.S. PATENT DOCUMENTS

| | | | | |
|---|---|---|---|---|
| 5,372,039 | A * | 12/1994 | Wiese | G01W 1/10 73/170.16 |
| 9,945,884 | B2 | 4/2018 | Froemel et al. | |
| 2007/0086893 | A1* | 4/2007 | Pedersen | G01P 5/165 416/61 |
| 2015/0377662 | A1* | 12/2015 | Ray | G01F 1/383 73/861.47 |
| 2016/0223579 | A1 | 8/2016 | Froemel et al. | |
| 2017/0192031 | A1* | 7/2017 | Ashmore | G01P 13/0066 |
| 2017/0307377 | A1* | 10/2017 | Yan | G01C 21/005 |
| 2017/0307647 | A1* | 10/2017 | Yan | G01P 5/14 |
| 2018/0062393 | A1* | 3/2018 | Bou-Zeid | H02J 3/381 |
| 2019/0154722 | A1* | 5/2019 | Chien | G01P 5/14 |
| 2019/0391287 | A1* | 12/2019 | Meier | G01V 1/223 |
| 2020/0340703 | A1* | 10/2020 | Kimura | F24F 11/79 |
| 2020/0393315 | A1 | 12/2020 | Li et al. | |
| 2022/0082495 | A1* | 3/2022 | Kreitinger | G05D 1/695 |

FOREIGN PATENT DOCUMENTS

| | | | |
|---|---|---|---|
| CN | 204882605 | U | 12/2015 |
| CN | 105842476 | A | 8/2016 |
| CN | 107389255 | A | 11/2017 |
| CN | 107764477 | | 3/2018 |
| CN | 110244076 | | 9/2019 |
| JP | H7-333366 | | 12/1995 |
| JP | 2016145734 | A | 8/2016 |
| WO | 2012048660 | A1 | 4/2012 |
| WO | 2017062585 | A1 | 4/2017 |

OTHER PUBLICATIONS

International Search Report and Written Opinion of the ISA dated Jun. 18, 2021, for PCT/FI2020/050613, 15 pp.
Written Opinion of the International Preliminary Examining Authority dated Nov. 18, 2021, for PCT/FI2020/050613, 9 pp.
Search Report, issued in Chinese Patent Application No. 202080097725 dated Jun. 30, 2025.
Search Report, issued in Chinese Patent Application No. 202080097725 dated Feb. 14, 2025.

* cited by examiner

WIND SPEED MEASUREMENT

This application is the U.S. national phase of International Application No. PCT/FI2020/050613 filed Sep. 22, 2020, which designated the U.S. the entire contents of which are hereby incorporated by reference.

TECHNICAL FIELD

The example and non-limiting embodiments of the present invention relate to a wind speed meter that enables wind speed measurement and/or estimation of atmospheric pressure.

BACKGROUND

Accurate and reliable measurement of wind speed plays a role in everyday life and recreational activities as well as in many fields of technology and commerce, such as weather forecasting, aviation and maritime operations, construction work, agriculture, etc.

A traditional instrument for wind speed measurement is an anemometer, where the speed of horizontal movement of air, i.e. the wind speed, is measured based on rotation speed of a vertically installed rotatable shaft provided with a plurality of vanes or cups. Another know technique for wind speed measurement includes usage of an ultrasonic wind sensor that measures the wind speed based on respective propagation time of a high-frequency sound between a plurality of transmitter-receiver pairs. A further example of wind speed measurement known in the art involves usage of an acoustic resonance sensor where the flow of air, i.e. the wind, is passed through a cavity where a plurality of ultrasonic transducers are applied to create respective standing-wave patterns, whereas the wind passing through the cavity results in a phase shift of the standing-wave patterns that is descriptive of the wind speed. Yet further examples of wind speed measurement techniques known in the art include remote sensing methods making use of devices such as lidar (light radar) or sodar (sound radar).

A recent approach for wind speed measurement is disclosed in U.S. Pat. No. 9,945,884 B2, which aims at measuring wind speed at a measurement device based on a difference between an atmospheric pressure measured by a first pressure sensor arranged inside a casing of the device and an air pressure measured by a second pressure sensor arranged at an opening in the casing. While such an arrangement allows for a relatively simple approach for measuring the wind speed in immediate vicinity of the measurement device, the measurement result is dependent on the shape of the casing, the shape and size of the opening in the casing, and the arrangement of the second pressure sensor with respect to the opening and the casing. Moreover, depending on specific shape of the opening, the airflow through the opening to the second pressure sensor may be highly sensitive to the wind direction, thereby increasing a risk of inaccurate measurement results depending on the wind direction. Consequently, the measured wind speed may reflect a characteristic of the measurement device design and depend on the wind direction, while it nevertheless results in a highly localized measurement result that may not adequately reflect the wind speed further away from the immediate surroundings of the measurement device, while typically a measure of interest is standard meteorological (surface) wind speed at 10 meter height in an open terrain

SUMMARY

It is an object of the present invention to provide a technique that facilitates reliable measurement of wind speed characteristics at a desired measurement height using a measuring arrangement that is simple in design and that allows for freedom in its installation point with respect to desired measurement height.

According to an example embodiment, an apparatus for wind speed measurement is provided, the apparatus comprising: a pressure sensor (110) arranged to provide a pressure sensor signal (111) that is descriptive of an instantaneous air pressure; a wind shield (115) arranged to prevent a direct airflow from the environment of the apparatus (100, 100-*k*) to the pressure sensor (110); and a processing unit (112, 120, 122) for deriving, based on the pressure sensor signal (111), one or more wind speed characteristics that are descriptive of the wind speed at a predefined reference measurement height.

According to another example embodiment, a wind speed measurement network is provided, the wind speed measurement network comprising a plurality of apparatuses according to an example embodiment described in the foregoing and a control apparatus, wherein each of the plurality of apparatuses is arranged for deriving respective one or more wind speed characteristics at a respective location, and the control apparatus is arranged to derive a wind speed profile based on the respective one or more wind speed characteristics obtained from the plurality of the apparatuses.

According to another example embodiment, a method for wind speed measurement is provided, the method comprising: using a pressure sensor having a wind shield arranged to prevent a direct airflow to the pressure sensor from the environment of an apparatus housing the pressure sensor to obtain a pressure sensor signal that is descriptive of an instantaneous air pressure; and deriving, based on the pressure sensor signal, one or more wind speed characteristics that are descriptive of the wind speed at a predefined reference measurement height.

According to another example embodiment, a computer program for measuring wind speed is provided, the computer program comprising computer readable program code configured to cause performing at least the following when said program code is executed on one or more computing apparatuses: receiving, from a pressure sensor having a wind shield arranged to prevent a direct airflow to the pressure sensor from the environment of an apparatus housing the pressure sensor, a pressure sensor signal that is descriptive of an instantaneous air pressure; and deriving, based on the pressure sensor signal, one or more wind speed characteristics that are descriptive of the wind speed at a predefined reference measurement height.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
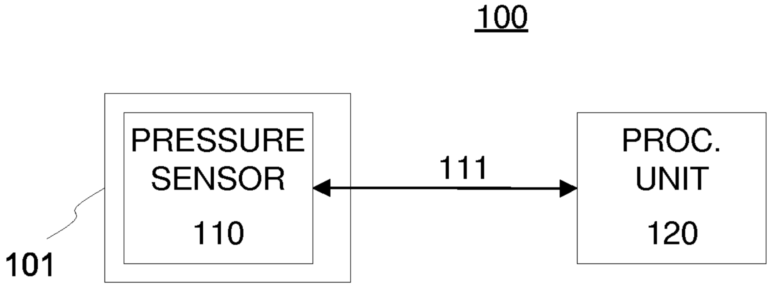
FIG. 1 illustrates a block diagram of some logical elements of a wind speed meter according to an example.

FIG. 1 illustrates a block diagram of some logical elements of a wind speed meter 100 according to an example. The wind speed meter 100 comprises a pressure sensor device 101 and a processing unit 120 that is communicatively coupled to the pressure sensor device 101. The pressure sensor device 101 comprises a pressure sensor 110 arranged to measure air pressure and the pressure sensor device 101 may be arranged to provide a pressure sensor signal 111 that is descriptive of instantaneous air pressure observed at the pressure sensor 110. The pressure sensor device 101 may provide the pressure sensor signal 111 via the communicative coupling to the processing unit 120, whereas the processing unit 120 may be arranged to compute one or more wind speed characteristics based on the pressure sensor signal 111. The communicative coupling between the pressure sensor device 101 and the processing unit 120 may be provided via a wired or wireless communication link, for example via using electrical wiring or via using a short-range wireless communication technique such as Bluetooth, Bluetooth Low-Energy (LE), ZigBee, WLAN/WiFi according to an IEEE 802.11 family of standards.

The pressure sensor 110 may basically comprise any pressure sensor known in the art. Non-limiting examples in this regard include a piezoresistive MEMS pressure sensor and capacitive MEMS pressure sensor. The wind speed meter 100 preferably comprises a single pressure sensor, in other words the pressure sensor 110 may be the only pressure sensor provided in the wind speed meter 100 for the purpose of facilitating measurement of the one or more wind speed characteristics. This enables cost-efficient implementation of the device while providing sufficient accuracy and reliability in estimating and/or reporting the wind speed at a predefined reference measurement height such that the operating location (e.g. installation height) of the wind speed meter 100, terrain around the wind speed meter 100 and/or objects located in vicinity of the wind speed meter 100 have only a negligible effect on the accuracy of the estimated wind speed. Herein, the reference measurement height may be the meteorological measurement height at 10 meters above the ground level, which is typically applied as the standard height for the exposure of wind instruments.

The wind speed meter 100 further comprises a wind shield 115 that is arranged to prevent a direct airflow from the environment of the wind speed meter 100 to the pressure sensor 110 when the wind speed meter is arranged in its operating position while allowing an indirect airflow from the environment of the wind speed meter 100 to the pressure sensor 110. As an example in this regard, the wind shield 115 may be arranged to protect the pressure sensor 110 against direct airflow coming from sides of the wind speed meter 100 and/or from above the wind speed meter 100 when the wind speed meter 100 is arranged in its operating position, whereas the wind shield 115 may allow airflow from below the pressure sensor 110. Hence, the wind shield 115 may serve to smoothen changes in the air pressure arising from changes in the airflow on the surface of the wind speed meter 100 that do not reflect the wind speed at the reference measurement height, thereby avoiding such changes from disturbing measurement of the wind speed at the reference measurement height.

Figure 2:
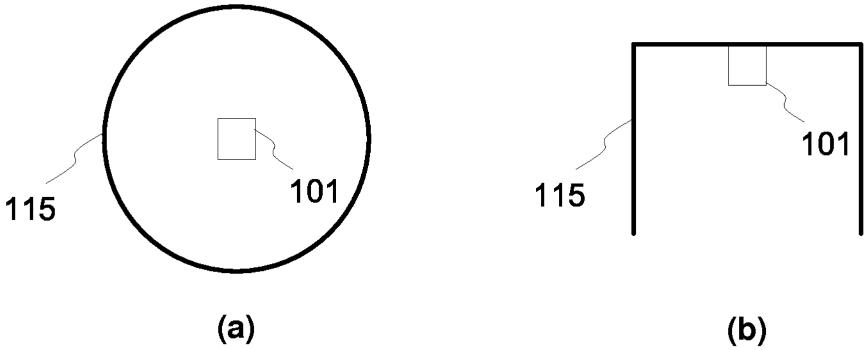
FIG. 2 schematically illustrates a wind shield according to an example.

FIG. 2 schematically illustrates the spatial relationship between the wind shield 115 and the pressure sensor device 101 according to an example, where the illustration (a) shows a top view to the wind shield 115 and to the pressure sensor device 101 arranged therein and where the illustration (b) shows a cross-section of a side-view to the arrangement of the wind shield 115 and the pressure sensor device 101 arranged therein. Herein, the terms 'top' and 'side' pertain to a scenario where the wind speed meter 100 is arranged in its operating position (e.g. an upright position). In the example of FIG. 2 the wind shield 115 is provided as a hollow tube or as a corresponding tubular arrangement, where the interior of the tube serves as a measurement volume or as a measurement chamber in which the pressure sensor device 101 is arranged. The pressure sensor device 101 may be mounted in the measurement chamber using a mounting arrangement attached to the inner side of the tube in order to position the pressure sensor device 101 in a desired position with respect to the tube serving as the wind shield 115. Hence, the side wall of the tube prevents direct airflow from the environment of the wind speed meter 100 from reaching the pressure sensor 110 while changes in instantaneous air pressure due to changes in wind speed are readily measurable by the pressure sensor 110 due to openings at the ends of the tube.

Still referring to the example of FIG. 2, the tube may have a covering portion arranged to close its first end while the second end of the tube may be open or may have an opening. The closed first end of the tube constitutes top end of the wind shield 115 (e.g. a lid) when the wind speed meter 100 is arranged in its operating position. In other words, in such an arrangement the wind shield 115 according to the example of FIG. 2 may have an overall shape of an inverted cup. Hence, the closed first end further prevents direct airflow from the environment of the wind speed meter 100 from reaching the pressure sensor 110, whereas changes in instantaneous air pressure due to changes in wind speed are readily measurable by the pressure sensor 110 due to opening in the bottom end of the tube. Moreover, the closed first end of the tube may serve to protect the pressure sensor device 101 e.g. from solar radiation as well as from rain and other types of precipitation and serve as the mounting arrangement for mounting the pressure sensor device 101 in the desired position with respect to the tube.

Figure 3:
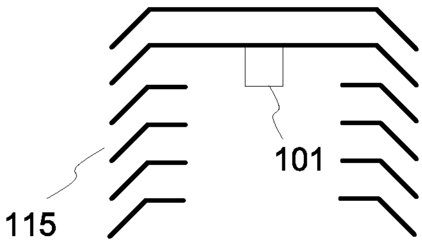
FIG. 3 schematically illustrates a wind shield according to an example.

FIG. 3 schematically illustrates a variation of the wind shield 115 of FIG. 2 according to an example via showing a cross-section of a side-view to the arrangement of the wind shield 115 and the pressure sensor device 101 arranged therein. In this example, the wind shield 115 comprises a stack of plates arranged at a predefined distance from each other, where each plate has a respective curved portion in its outer perimeter that is curved or inclined downwards and one or more adjacent plates in the stack have a respective opening in its central portion to provide the measurement volume or measurement chamber within the stack of plates. The curved portion at the perimeter of a plate has a size and/or inclination that at least covers the gap between the plate and the next plate immediate below said plate in the vertical direction, thereby preventing the direct airflow between the plates from reaching the pressure sensor 110 arranged in the measurement volume while still allowing indirect airflow to the measurement volume. The pressure sensor device 101 may be mounted in a desired position within the measurement volume by a mounting arrangement that attaches to one or more of said plates. One or more plates at the top of the stack (e.g. the topmost plate of the stack) may be provided without the opening, thereby covering the measurement volume to further prevent the direct airflow from the environment of the wind speed meter 100 from reaching the pressure sensor 110 and to protect the pressure sensor device 101 therein from solar radiation as well as from rain and other types of precipitation and possibly also serving as the mounting arrangement for mounting the pressure sensor device 101 in the desired position within the measurement volume. The wind shield 115 according to the example of FIG. 3 may comprise a solar radiation shield typically applied for (professional) outdoor thermometers.

The wind shield structures according to examples of FIGS. 2 and 3 serve as non-limiting examples of structures that enable preventing the direct airflow from the environment of the wind speed meter 100 from reaching the pressure sensor 110 when the wind speed meter is arranged in its operating position while allowing an indirect airflow from the environment of the wind speed meter 100 to the pressure sensor 110. Hence, wind shield 115 may have a structure that differs from the examples of FIGS. 2 and 3 without departing from the scope of the present invention. As a few examples in this regard, the horizontal cross section of the wind shield 115 does not need to be circular but the cross section may be, for example, a rectangular, hexagonal, oval-shaped, etc. and/or the horizontal cross section of the wind shield 115 does not need to be the same along the vertical dimension of the wind shield 115 but an overall shape that gradually widens from the top towards the bottom may be applied instead (e.g. a conical overall shape instead of a tubular overall shape). The shield may comprise or be made of a material that is impermeable or substantially impermeable by the airflow. As non-limiting examples in this regard, the shield may be made of metal or substantially rigid plastic material.

The size of the wind shield 115 and the size of the measurement volume within the wind shield 115 may be selected, for example, in dependence of the type and position of the pressure sensor 110 within the measurement volume. As non-limiting examples, the height of the wind shield 115 may be in a range from 10 to 50 centimeters (cm) and/or the (lateral) cross-section of the wind shield may have a width (e.g. a radius) in a range from 10 to 30 cm. Still referring to a non-limiting example, the pressure sensor device 101 may be installed in the measurement volume within the wind shield 115 such that the pressure-sensitive portion(s) of the pressure sensor 110 are arranged at least at a predefined distance from the wind shield 115. The distance may be chosen, for example, from a range from 10 to 200 millimeters (mm), e.g. 50 mm, whereas a suitable distance may depend on the employed sensor type, on the type of the wind shield 115 and/or on the size of the measurement volume.

The wind shield 115 may further serve to protect the pressure sensor device 101 arranged therein against contamination due to environmental conditions by preventing rain, moisture, snow, dust, dirt and/or other particles possibly present in the operating environment of the wind speed meter 100 from entering the pressure sensor 110, thereby ensuring undisturbed operation of the wind speed meter 100. Additionally or alternatively, the pressure sensor device 101 may further comprise a dedicated filter portion for protecting the pressure sensor against moisture, dust, etc. The filter portion may enclose the pressure sensor 110 or it may enclose at least a portion of the pressure sensor 110 that is exposed to ambient air within the measurement volume.

The wind speed meter 100 does not need to be installed at the reference measurement height for correct operation but, in contrast, wind speed measurement by the wind speed meter 100 may be carried out close to the ground level with the wind speed meter 100 installed at a height from a few tens of centimeters to a couple of meters from the ground level while still correctly reflecting wind speed characteristics at the reference measurement height. Moreover, while typically installed in an outdoor location, the wind speed meter 100 enables measurement of wind speed (outdoors) at the reference measurement height at a reasonable accuracy and reliability even when installed indoors. For reliable and accurate operation, the wind speed meter 100 is preferably installed in operating position such that any movement, especially vertical movement, of the device is prevented during the measurement process. In this regard, any (vertical) movement risks introducing (also) air pressure changes arising from movement of the wind speed meter 100, which may compromise the accuracy and/or reliability of the air-pressure-based wind speed estimation.

Along the lines described in the foregoing, the processing unit 120 is arranged to receive the pressure sensor signal 111 from the pressure sensor 110. In this regard, the processing unit may be arranged to read pressure sensor signal 111 according to a predefined schedule and to arrange and/or process pressure values so obtained as a time series of pressure values. As an example, the pressure values may be read at predefined time intervals, i.e. at a predefined sampling rate $f_p$, which may be, for example, in a range from 0.1 to 10 Hz, e.g. 1 Hz. In general, choosing a higher sampling rate $f_p$ (i.e. a shorter time interval) enables acquiring a higher amount of data on variation of the air pressure, thereby enabling acquisition of a more accurate pressure distribution at the cost of increased computational load in processing the data, whereas choosing a lower sampling rate $f_p$ (i.e. a longer time interval) may reduce accuracy of the computation while allowing for lower computational load. In a practical point of view, the most appropriate sampling rate $f_p$ (or the schedule of reading the pressure signal 111) may be found as one that provides sufficient accuracy of computation in view of the cost of the required processing capacity available at the processing unit 120, whereas also e.g. sensitivity, speed and/or accuracy of the applied pressure sensor 110 may have an effect on choosing the most expedient time interval.

The processing unit 120 may be arranged to process the time series of pressure values in time frames of predefined size. This may result in processing the time series of pressure values as a sequence of time frames, where the time frames may be non-overlapping in time or the time frames may be partially overlapping in time. The sequence of time frames may be specified via a frame rate $f_f$ and the size of the time frames (which may be specified via their duration or as a number of consecutive pressure values included in a time frame). In an example, each time frame may include $K_f$ consecutive pressure values with overlap of $K_f-1$ samples with the preceding time frame and, consequently, the frame rate $f_f$ may be the same as the sampling rate $f_p$ applied in reading the pressure values, whereas in other examples the overlap may be smaller than $K_f-1$ samples (with the frame rate $f_f$ reducing accordingly). In a further example, each time frame may include $K_f$ consecutive pressure values without overlap with the preceding time frame and, consequently, the frame rate $f_f$ may be the sampling rate $f_p$ applied in reading the pressure values divided by $K_f$, i.e. $f_f=f_p/K_f$.

As a non-limiting example, the frame size $K_f$ may be selected such that it covers a desired time period in a range from a few seconds to a few tens of seconds, e.g. 10 seconds The most appropriate frame rate $f_f$, time frame size $K_f$ and extent of overlap between consecutive time frames (if any) depends, for example, on the desired update rate of the computed wind speed characteristics, on the sampling rate $f_p$ applied in reading the pressure values, and on the processing capacity available at the processing unit 120. The processing unit 120 may be arranged to compute respective one or more wind speed characteristics for each time frame based on the pressure values within the respective time frame, thereby providing a respective time series of the one or more wind speed characteristics that represent respective characteristics of the wind speed as a function of time. The one or more wind speed characteristics may comprise a maximum wind speed and/or an average wind speed.

The processing unit 120 may be arranged to determine, in each time frame n, a respective reference wind speed $v_{ref}(n)$ based on one or more aspects of a distribution of pressure values within the respective time frame. As an example in this regard, the processing unit 120 may determine, in each time frame n, a respective maximum pressure $p_{max}(n)$ and a minimum pressure $p_{min}(n)$ within the time frame n and compute the reference wind speed $v_{ref}(n)$ for the time frame n based on a difference between the maximum pressure $p_{max}(n)$ and the minimum pressure $p_{min}(n)$. As an example in this regard, the computation may comprise computing a reference wind speed $v_{ref}(n)$ for the time frame n as a product of a predefined scaling factor C and the square root of the difference between the maximum pressure $p_{max}(n)$ and the minimum pressure $p_{min}(n)$, which may be denoted as $$v_{ref}(n) = C\sqrt{p_{max}(n) - p_{min}(n)}.$$

The scaling factor C may be defined in dependence of the applied reference measurement height, in dependence of characteristics at the usage location (e.g. the installation height) of the wind speed meter 100 and/or in dependence of characteristics of pressure values derived based on the pressure sensor signal 111. Setting or selecting the value for the scaling factor C may be carried out as part of manufacturing, installing, configuring or reconfiguring the wind speed meter 100. As an example, assuming pressure values being provided as millipascals (mPa), the value of the scaling factor C may be a value from the range from 0.05 to 0.2, e.g. 0.12.

In another example, the processing unit 120 may determine the respective reference wind speed $v_{ref}(n)$ for time frame n based on one or more aspects of a distribution of differences between consecutive pressure values within the respective time frame. As an example in this regard, the processing unit 120 may determine, in each time frame n, a respective mean square (RMS) value $\Delta p_{rms}(n)$, computed as a RMS value of differences between consecutive pressure values over the time frame n. As an example in this regard, the computation may comprise computing a reference wind speed $v_{ref}(n)$ for the time frame n as a product of the scaling factor C and the square root of a scaled value of the above-mentioned RMS value $\Delta p_{rms}(n)$, which may be denoted as $$v_{ref}(n) = C\sqrt{3 * \Delta p_{rms}(n)}.$$

The reference wind speeds $v_{ref}(n)$ constitute a time series of reference values at the chosen frame rate $f_f$, which time series may serve as basis for computing the one or more wind speed characteristics, such as a maximum wind speed $v_{max}(n)$ and/or an average wind speed $v_{avg}(n)$ at the time frame n. As an example in this regard, the maximum wind speed $v_{max}(n)$ may be derived by finding the maximum value of reference wind speeds $v_{ref}(n)$ within a predefined time window pertaining to the time frame n and/or the average wind speed $v_{avg}(n)$ may be derived by computing an average of reference wind speeds $v_{ref}(n)$ over said time window. Herein, the time window pertaining to the time frame n may be defined as one that covers a time period of predefined duration that includes the time frame n. As examples in this regard, the time window may be arranged with respect to the time frame n such that the time frame n is the last time frame within the time window or that the time window is centered around the time frame n. The duration of the time window may be chosen, for example, from a range from a few minutes to a few tens of minutes, e.g. ten minutes.

In another example, the maximum wind speed $v_{max}(n)$ may be derived in an iterative manner based on the time series of reference wind speed values $v_{ref}(n)$, thereby reducing computational load required for its derivation. As an example in this regard, the maximum wind speed $v_{max}(n)$ for the time frame n may be computed as a linear combination of the reference wind speed $v_{ref}(n)$ obtained for the time frame n and the maximum wind speed $v_{max}(n-1)$ derived for time frame n−1, thereby implementing a non-symmetric exponential filter for the time series of reference wind speeds $v_{ref}(n)$. As an example of such an approach, the maximum wind speed $v_{max}(n)$ for the time frame n may be computed according to the following equation:

$$v_{max}(n) = \begin{cases} A_{up}v_{ref}(n) + (1 - A_{up})v_{max}(n-1), & \text{if } v_{ref}(n) > v_{max}(n-1) \\ A_{dn}v_{ref}(n) + (1 - A_{dn})v_{max}(n-1), & \text{otherwise} \end{cases}.$$

where $A_{up}$ and $A_{dn}$ are respective predefined constant values that serve to define respective scaling factors for deriving the linear combination of the reference wind speed $v_{ref}(n)$ obtained for the time frame n and the maximum wind speed $v_{max}(n-1)$ derived for time frame n−1. Herein, the constants $A_{up}$ and $A_{dn}$ may have respective positive values that are less than unity (i.e. $0<A_{up}<1$ and $0<A_{up}<1$) where $A_{up}$ is larger than Aan (i.e. $A_{up}>A_{dn}$). As non-limiting examples, the value of $A_{up}$ may be a value chosen from the range from 0.1 to 0.2, e.g. 0.15 and the value of $A_{dn}$ may be a value chosen from the range from 0.01 to 0.1, e.g. 0.05.

Along similar lines, the average wind speed $v_{avg}(n)$ may be derived in an iterative manner based on the time series of reference wind speed values $v_{ref}(n)$, thereby reducing computational load required for its derivation. As an example in this regard, the average wind speed $v_{avg}(n)$ for the time frame n may be computed as a linear combination of the reference wind speed $v_{ref}(n)$ obtained for the time frame n and the average wind speed $v_{avg}(n-1)$ derived for time frame n−1, thereby implementing a (second) non-symmetric exponential filter for the time series of reference wind speeds $v_{ref}(n)$. As an example of such an approach, the average wind speed $v_{avg}(n)$ for the time frame n may be computed according to the following equation:

$$v_{avg}(n) = \begin{cases} B_{up} v_{ref}(n) + (1 - B_{up}) v_{avg}(n-1), & \text{if } v_{ref}(n) > v_{avg}(n-1) \\ B_{dn} v_{ref}(n) + (1 - B_{dn}) v_{avg}(n-1), & \text{otherwise} \end{cases}.$$

where $B_{up}$ and $B_{dn}$ are respective predefined constant values that serve to define respective scaling factors for deriving the linear combination of the reference wind speed $v_{ref}(n)$ obtained for the time frame n and the average wind speed $v_{avg}(n-1)$ derived for time frame n−1. Herein, the constants $B_{up}$ and $B_{dn}$ may have respective positive values that are less than unity (i.e. $0<B_{up}<1$ and $0<B_{up}<1$). As non-limiting examples, the respective value of each of $B_{up}$ and $B_{dn}$ may be a value chosen from the range from 0.01 to 0.1, e.g. 0.05.

According to an example, a pressure sensor noise may be subtracted from the derived one or more wind speed characteristics, e.g. from respective values of the maximin wind speed $v_{max}(n)$ and/or the average wind speed $v_{avg}(n)$. This may apply to all wind speed characteristics or only to those that are below a respective predefined threshold, i.e. in scenarios where estimation error resulting from the pressure sensor noise may have a non-negligible effect on the derived wind speed characteristics. In an example, the pressure sensor noise may be found as the minimum value of the time series of reference wind speeds $v_{ref}(n)$ over an extended time period (e.g. one extending over several weeks or even several months), thereby representing a scenario where the measured wind speed can be assumed to be zero or close to zero, i.e. a calm situation.

Additionally or alternatively, the processing unit 120 may be arranged to compute an estimate of the atmospheric (barometric) pressure at the operating location (e.g. the installation height) of the wind speed meter 100 based on the pressure values obtained from the pressure sensor 110. As an example, the ambient pressure may be computed as a median or as an average of pressure values within a time window of predefined length. In this regard, the time window length may be chosen, for example, from a range from a few tens of seconds to a few minutes, e.g. one minute.

The example of FIG. 1 depicts an arrangement where the pressure sensor device 101 is arranged to provide the processing unit 120 with the pressure sensor signal 111 that is (directly) descriptive of the observed instantaneous air pressure as a function of time and hence enables deriving an air pressure distribution and/or desired statistical values thereof, while the processing required for computation of the maximum wind speeds $v_{max}(n)$ and/or the average wind speeds $v_{avg}(n)$ is substantially carried out in the processing unit 120. Such a design enables providing the pressure sensor device 101 as a simple entity that passes the electrical signal that is descriptive of the instantaneous air pressure as the pressure sensor signal 111 to the processing unit 120, which provides the required computation resources for carrying out the computation required for derivation of the one or more wind speed characteristics such as the maximum wind speeds $v_{max}(n)$ and/or the average wind speeds $v_{avg}(n)$ as well as other statistical measures of the air pressure distribution, such as standard deviation, that may be useable for deriving further aspects pertaining to the wind speech characteristics.

Figure 4:
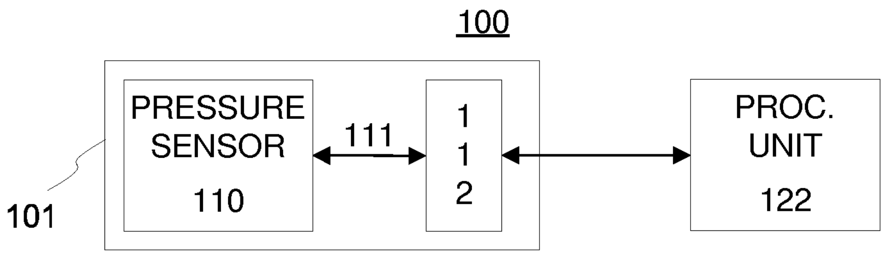
FIG. 4 illustrates a block diagram of some logical elements of a wind speed meter according to an example.

FIG. 4 illustrates a block diagram of some logical elements of a wind speed meter 100 according to another example, wherein the pressure sensor device 101 comprises the pressure sensor 110 and a first processing unit 112 that receives the pressure sensor signal 111 from the pressure sensor 110. Hence, the pressure sensor device 101 is communicatively coupled to a second processing unit 122. The communicative coupling between the first processing unit 112 and the second processing unit 122 may be provided via a wireless or wired communication network or communication link (along the lines described with references to the example of FIG. 1), whereas the operations described in the foregoing for the processing unit 120 may be distributed to the first processing unit 112 and the second processing unit 122. As an example of such distribution of operations, the first processing unit 112 may be arranged to find the maximum pressure $p_{max}(n)$ and the minimum pressure $p_{min}(n)$ possibly together with further statistical values that are descriptive of the pressure distribution for each time frame n, whereas the second processing unit 122 may be arranged to compute the one or more wind speed characteristics, such as the respective maximum wind speed $v_{max}(n)$ and/or the respective average wind speed $v_{avg}(n)$, for each time frame n based on the information obtained from the pressure sensor device 101. A design according to the example of FIG. 4 may enable usage of processing units 112, 122 of simpler design in comparison to the processing unit 120 of the example of FIG. 1 and/or enable computational advantages e.g. in a scenario where the maximum and minimum pressures $p_{max}(n)$, $p_{min}(n)$ (and/or other statistical values that are descriptive of the pressure distribution) obtained from the first processing unit 112 may be applied by a plurality of second processing units 122 for respective computation of the maximum and minimum pressures $p_{max}(n)$, $p_{min}(n)$ therein.

Figure 5:
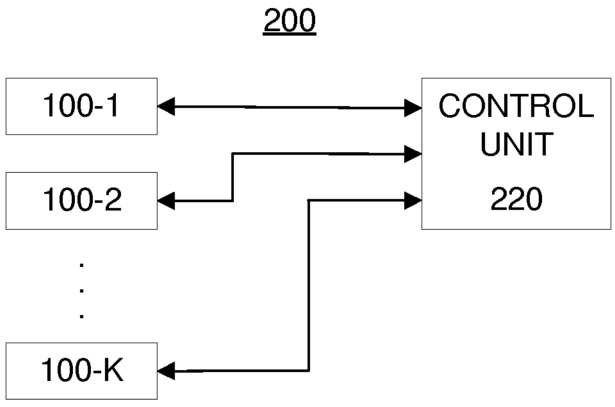
FIG. 5 illustrates a block diagram of some logical elements of a wind speed measurement network according to an example.

The description in the foregoing pertains to a structure and operation of a single wind speed meter 100 for derivation of the one or more wind speed characteristics pertaining to the reference measurement height at the site of using the wind speed meter 100. In a further example, a plurality of wind speed meters 100 may be applied to provide a wind speed measurement network. FIG. 5 illustrates a block diagram of some logical elements of a wind speed measurement network 200 comprising wind speed meters 100-1, 100-2, . . . , 100-K, each communicatively coupled to a control unit 220 via a wireless or wired communication network or communication link. Herein, the wind speed meters 100-1, 100-2, . . . , 100-K represent the plurality of (i.e. two or more) wind speed meters 100 and a reference designator 100-*k* may be applied to refer to any of the plurality of wind speed meters 100.

According to an example, each of the wind speed meters 100-*k* may be arranged to compute the respective one or more wind speed characteristics and/or the atmospheric (barometric) pressure and to transmit this information to the control unit 220 for further processing therein, the information received at the control unit comprising e.g. the respective maximum wind speed $v_{k,max}(n)$, the respective average wind speed $v_{k,avg}(n)$, and/or the respective estimated ambient pressure for the wind speed meter k in time frames n. In another example, each of the wind speed meters 100-*k* may be arranged to find the respective maximum and minimum pressures $p_{max}(n)$, $p_{min}(n)$ (possibly together with further statistical values that are descriptive of the pressure distribution at the wind speed meter 100-*k* in the time frame n) and transmit this information to the control unit 220. Consequently, the control unit 220 may derive the respective one or more wind speed characteristics based on the the respective maximum and minimum pressures $p_{max}(n)$, $p_{min}(n)$ received from the wind speed meters 100-*k*, e.g. the respective maximum wind speed $v_{k,max}(n)$ and/or the respective average wind speed $v_{k,avg}(n)$ for the wind speed meter 100-*k* in time frames n. In the latter scenario, the control unit 220 may hence carry out some of the computation described in the foregoing and/or in the following for the second processing unit 122 for the plurality of wind speed meters 110-*k*. In this regard, for example the computation of the maximum wind speed $v_{k,max}(n)$ for the wind speed meter 100-*k* may employ the scaling factor $C_k$ that is calibrated for the position and/or reference measurement height of the wind speed meter 100-*k*.

The plurality of wind speed meters 100-*k* may be arranged to measure respective one or more wind speed characteristics at different locations within an area of interest to enable observing variations of wind speed across the area of interest, whereas the control unit 220 may be arranged to derive a wind speed profile based on the respective one or more wind speed characteristics obtained from the plurality of wind speed meters 100-*k*, thereby enabling the control unit 220 e.g. to track and/or recognize locally-occurring gusts of wind and/or wind shear within the area of interest. The plurality of wind speed meters 100-*k* may be further applied to estimate the respective atmospheric pressure at respective locations within the area of interest, whereas the control unit 220 may be arranged to estimate wind direction within the area of interest based on the respective atmospheric pressures estimated at the respective locations of the plurality of wind speed meters 100-*k*. As an example in this regard, the control unit 220 may derive an atmospheric pressure contour map (e.g. an isobar map) based on the respective atmospheric pressures derived at respective locations of the plurality of wind speed meters 100-*k*, whereas derivation or estimation of (average) wind direction with the area of interest may be carried out based on the atmospheric pressure contour map. In this regard, at a typical installation height of the wind speed meters 100-*k* the wind direction may be assumed to be from a higher atmospheric pressure to a lower one, thereby enabling wind direction estimation based on the atmospheric pressures estimated at respective locations of the wind speed meters 100-*k* of the measurement network 200.

The wind speed meter 100 and/or the wind speed measurement network based on a plurality of wind speed meters 100-*k* enables reliable measurement of wind speed characteristics at the reference measurement hight without the need to install the wind speed meter 100, 100-*k* at the reference measurement height of interest (which is typically several meters above the ground level and requires a mast or supporting structure of other type) while being insensitive to disturbances caused by objects near the wind speed meter 100, 100-*k*. Moreover, the wind speed meter 100, 100-*k* may be provided as a relatively simple device(s), thereby providing a cost-effective approach for the wind speed measurement even if employing a large number of wind speed meters 100, 100-*k* arranged into the wind speed measurement network 200 while on the other hand enabling using the wind speed meter 100 in a home weather station without the need for special arrangements for its installation at the reference measurement height of interest. The wind speed meter 100, 100-*k* may provide also improved measurement of wind speed characteristics in comparison to typical industrial weather stations applied in various locations e.g. in urban areas, traffic routes, industrial areas, etc. due to their installation in manner that enables measurement of environmental parameters other than wind speed, thereby possibly rendering such weather stations unsuited for wind speed measurements at the meteorological measurement height at 10 meters above the ground level.

Figure 6A:
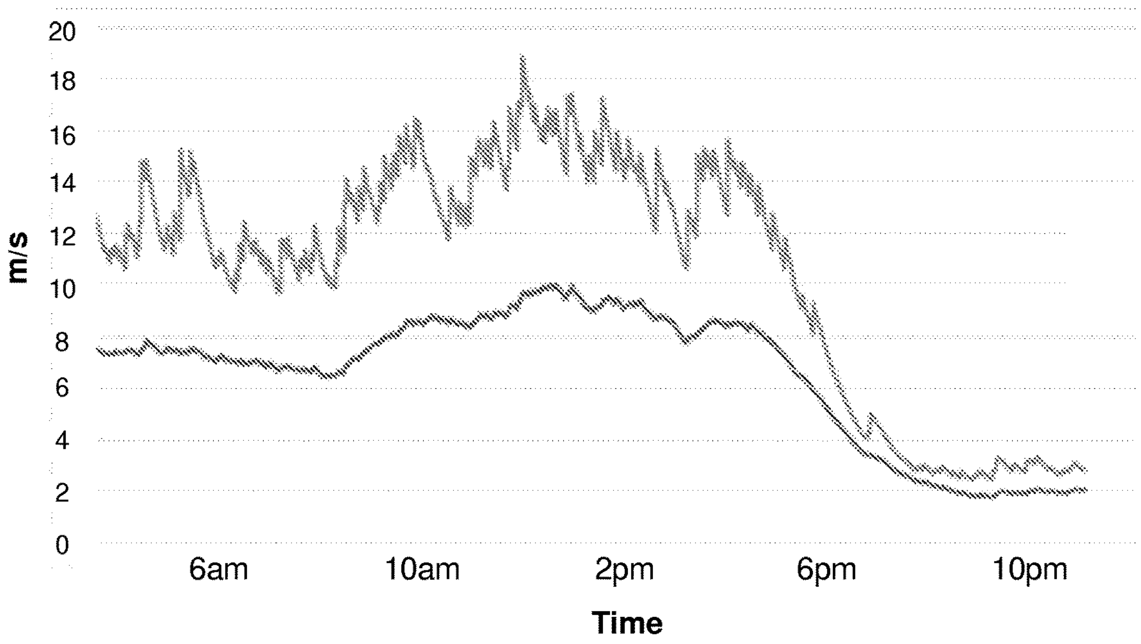
FIGS. 6A and 6B illustrate respective examples of wind speed characteristics obtained via usage of a disclosed technique and via usage of a reference system.
Figure 6B:
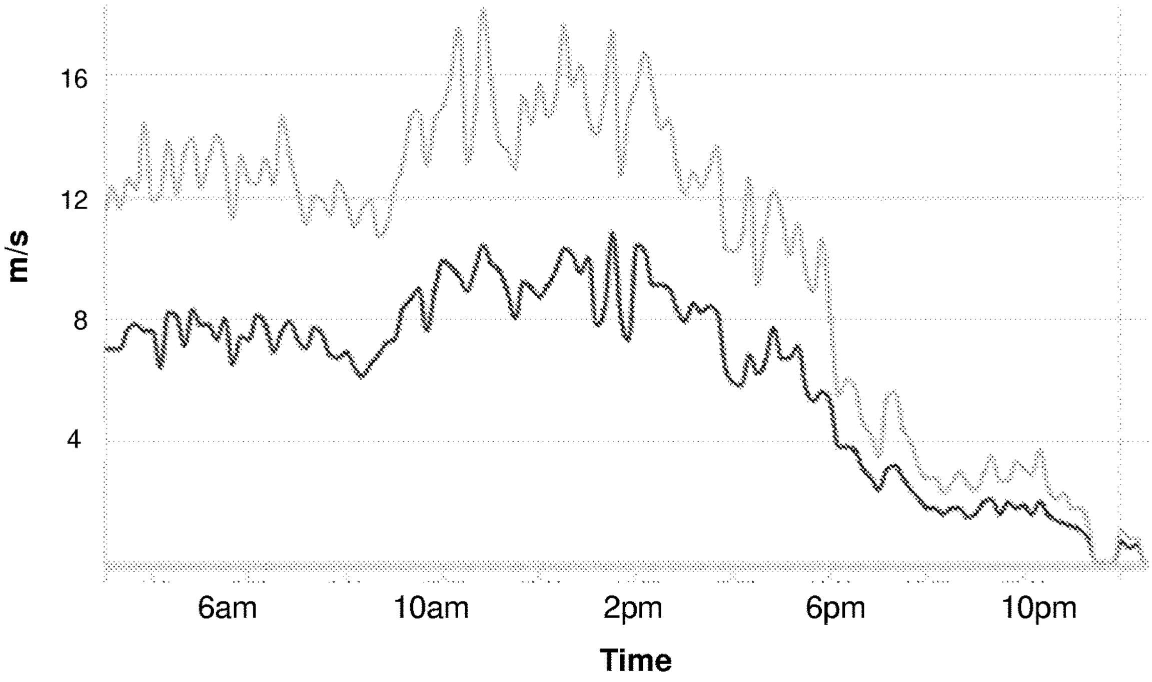

FIGS. 6A and 6B illustrate an extract of practical experiments carried out in order to validate operation of a prototype of the wind speed meter 100. In this regard, FIG. 6A illustrates wind speed characteristics measured close to an airport using the wind speed meter 100, whereas FIG. 6B illustrates corresponding wind speed characteristics measured at the airport during the same time period using well-established previously known wind measurement equipment. In particular, the upper curve in FIG. 6A represents the maximum wind speed as a function of time derived via usage of the wind speed meter 100 and whereas the lower curve of FIG. 6A represents the average wind speed derived via usage of the wind speed meter 100, whereas the upper curve of FIG. 6B represents the maximum wind speed as a function of time measured at the airport and the lower curve of FIG. 6B represents the average wind speed measured at the airport. Despite the small differences in fine detail, the wind speed measurement results of the wind speed meter 100 shown in the example of FIG. 6A closely follow those of the professional wind speed measurement equipment shown in FIG. 6B.

Figure 7:
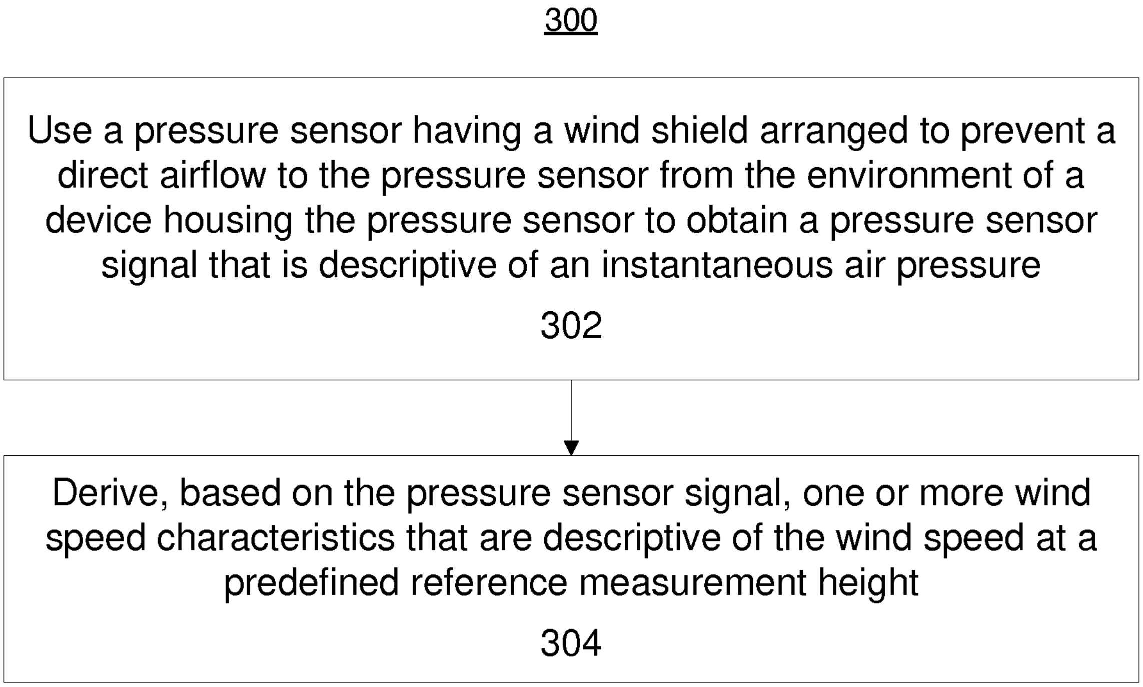
FIG. 7 illustrates a method according to an example.

The operations pertaining to wind speed measurement described in the foregoing with references to the wind speed meter 100, 100-*k* and/or to the wind speed measurement network 200 may be described as steps of a method. As an example in this regard, FIG. 7 depicts a flowchart illustrating a method 300, which may be carried out, for example, by the processing unit 120, jointly by the first processing unit 112 and the second processing unit 122, or by the control unit 220. Respective operations described with references to blocks 302 to 304 pertaining to the method 300 may be implemented, varied and/or complemented in a number of ways, for example as described with references to the wind speed meter 100, 100-*k* and/or to the wind speed measurement network 200 in the foregoing and/or in the following.

The method 300 comprises using the pressure sensor 110 having the shield arranged to prevent the direct airflow to the pressure sensor 110 from the environment of the wind speed meter 100 housing the pressure sensor 110 to obtain the pressure sensor signal 111 that is descriptive of an instantaneous air pressure, as indicated in block 302, and deriving, based on the pressure sensor signal 111, the one or more wind speed characteristics that are descriptive of the wind speed at a predefined measurement height, as indicted in block 304.

Figure 8:
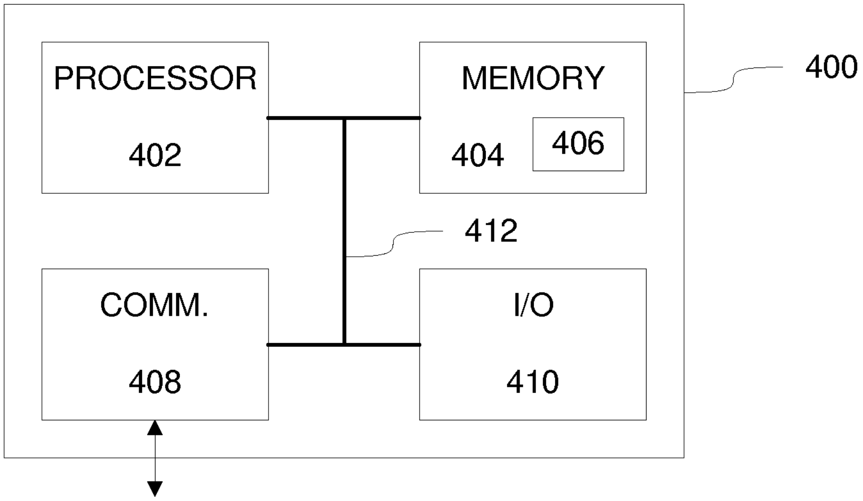
FIG. 8 illustrates a block diagram of some components of an apparatus according to an example.

FIG. 8 schematically illustrates some components of an apparatus 400 that may be employed to implement any of the processing unit 120, the first processing unit 112, the second processing unit 122 and the control unit 220 or a portion thereof. The apparatus 400 comprises a processor 402 and a memory 404. The memory 404 may store data and computer program code 406. The apparatus 400 may further comprise communication means 408 for wired or wireless communication with other apparatuses and/or user I/O (input/output) components 410 that may be arranged, together with the processor 402 and a portion of the computer program code 406, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 400 are communicatively coupled to each other via a bus 412 that enables transfer of data and control information between the components.

The memory 404 and a portion of the computer program code 406 stored therein may be further arranged, with the processor 402, to cause the apparatus 400 to perform at least some aspects of operation of any of the processing unit 120, the first processing unit 112, the second processing unit 122 and the control unit 220 described in the foregoing. The processor 402 is configured to read from and write to the memory 404. Although the processor 402 is depicted as a respective single component, it may be implemented as respective one or more separate processing components. Similarly, although the memory 404 is depicted as a respective single component, it may be implemented as respective one or more separate components, some or all of which may be integrated/removable and/or may provide permanent/semi-permanent/dynamic/cached storage.

The computer program code 406 may comprise computer-executable instructions that implement at least some aspects of operation of any of the processing unit 120, the first processing unit 112, the second processing unit 122 and the control unit 220 described in the foregoing when loaded into the processor 402. As an example, the computer program code 406 may include a computer program consisting of one or more sequences of one or more instructions. The processor 402 is able to load and execute the computer program by reading the one or more sequences of one or more instructions included therein from the memory 404. The one or more sequences of one or more instructions may be configured to, when executed by the processor 402, cause the apparatus 400 to perform at least some aspects of operation of any of the processing unit 120, the first processing unit 112, the second processing unit 122 and the control unit 220 described in the foregoing. Hence, the apparatus 400 may comprise at least one processor 402 and at least one memory 404 including the computer program code 406 for one or more programs, the at least one memory 404 and the computer program code 406 configured to, with the at least one processor 402, cause the apparatus 400 to perform at least some aspects of operation of any of the processing unit 120, the first processing unit 112, the second processing unit 122 and the control unit 220 described in the foregoing.

The computer program code 406 may be provided e.g. a computer program product comprising at least one computer-readable non-transitory medium having the computer program code 406 stored thereon, which computer program code 406, when executed by the processor 402 causes the apparatus 400 to perform at least some aspects of operation of any of the processing unit 120, the first processing unit 112, the second processing unit 122 and the control unit 220 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. An apparatus for measuring meteorological surface wind speed, the apparatus comprising:
- a wind shield defining a measurement volume therein;
- a pressure sensor disposed within the measurement volume such that the wind shield is configured to prevent a direct airflow from an environment of the apparatus to the pressure sensor when the apparatus is in an operating position to carry out the wind speed measurement, the pressure sensor thereby configured to provide a pressure sensor signal that is descriptive of an instantaneous atmospheric pressure in ambient air within the measurement volume, the pressure sensor being the only pressure sensor provided in the apparatus to facilitate the wind speed measurement; and
- a processor configured to derive, based on the pressure sensor signal, one or more surface wind speed characteristics that are descriptive of the wind speed at a meteorological measurement height of 10 meters above ground level, the processor being configured to:
  - derive a time series of pressure values by sampling the pressure sensor signal to facilitate processing the pressure values as a sequence of time frames, each respective time frame including a predefined number of consecutive pressure values,
  - derive, for each respective time frame of the sequence of time frames based on a variation of pressure values within the respective time frame, a respective reference wind speed value, thereby obtaining a time series of reference wind speed values,
  - compute, for each respective time frame of the sequence of time frames, respective one or more surface wind speed characteristics based on the time series of reference wind speed values, and
  - one or more of: (i) display the one or more computed surface wind speed characteristics on a display, and (ii) transmit the one or more computed surface wind speed characteristics to another apparatus.

2. The apparatus according to claim 1, wherein the wind shield is configured to allow an indirect airflow from the environment of the apparatus to the pressure sensor.

3. The apparatus according to claim 2, wherein computing the respective one or more wind speed characteristics for the respective time frame comprises deriving an average wind speed for the respective time frame.

4. The apparatus according to claim 1, wherein deriving the respective reference wind speed for the respective time frame comprises:
- determining, within pressure values of the respective time frame, respective maximum and minimum pressures for the respective time frame; and
- computing the respective reference wind speed for the respective time frame based on a difference between the maximum pressure and the minimum pressure found for the respective time frame.

5. The apparatus according to claim 4, wherein computing the respective one or more wind speed characteristics for the respective time frame comprises deriving a maximum wind speed for the respective time frame.

6. The apparatus according to claim 5, wherein deriving the maximum wind speed for the respective time frame comprises finding a maximum reference wind speed within a predefined time window that includes the respective time frame.

7. The apparatus according to claim 5, wherein deriving the maximum wind speed for the respective time frame comprises deriving the maximum wind speed for the respective time frame as a linear combination of a maximum wind speed derived for a preceding time frame and the reference wind speed derived for the respective time frame.

8. The apparatus according to claim 5, wherein computing the respective one or more wind speed characteristics for the respective time frame comprises deriving an average wind speed for the respective time frame.

9. The apparatus according to claim 4, wherein computing the respective reference wind speed for the respective time frame comprises computing the respective reference wind speed for the respective time frame based on a square root of the difference between the maximum pressure and the minimum pressure found for the respective time frame.

10. The apparatus according to claim 9, wherein computing the respective reference wind speed for the respective time frame comprises multiplying the square root of the difference between the maximum pressure and the minimum pressure found for the respective time frame by a predefined scaling factor that is defined at least in dependence of the reference measurement height.

11. The apparatus according to claim 10, wherein the scaling factor is defined further in dependence of characteristics of an installation height of the apparatus.

12. The apparatus according to claim 4, wherein computing the respective one or more wind speed characteristics for the respective time frame comprises deriving an average wind speed for the respective time frame.

13. The apparatus according to claim 1, wherein computing the respective one or more wind speed characteristics for the respective time frame comprises deriving an average wind speed for the respective time frame.

14. The apparatus according to claim 13, wherein deriving the average wind speed for the respective time frame comprises computing an average of the reference wind speeds within a predefined time window that includes the respective time frame.

15. The apparatus according to claim 14, wherein deriving the average wind speed for the respective time frame comprises deriving the average wind speed for the respective time frame as a linear combination of an average wind speed derived for a preceding time frame and the reference wind speed derived for the respective time frame.

16. The apparatus according to claim 1, wherein the processor is configured to:

derive the time series of pressure values based on the pressure sensor signal for processing the pressure values as the sequence of time frames; and estimate an ambient pressure based on an average of the pressure values within a predefined time window.

17. A wind speed measurement network, comprising:

a plurality of apparatuses according to claim 1; and a control apparatus, wherein each of the plurality of apparatuses is configured to derive respective one or more wind speed characteristics at a respective location, and the control apparatus is configured to derive a wind speed profile based on the respective one or more wind speed characteristics obtained from the plurality of the apparatuses.

18. The wind speed measurement network according to claim 17, wherein each of the plurality of apparatuses is configured to estimate a respective ambient pressure at the respective location, and the control apparatus is configured to estimate wind direction based on the respective ambient pressures estimated for the respective locations of the plurality of the apparatuses.

19. A method for measuring meteorological surface wind speed, the method comprising:

using a pressure sensor disposed within a measurement volume defined inside a wind shield such that the wind shield is configured to prevent a direct airflow to the pressure sensor from an environment of an apparatus housing the pressure sensor when the apparatus is in an operating position to carry out the wind speed measurement to obtain a pressure sensor signal that is descriptive of an instantaneous atmospheric pressure in ambient air within the measurement volume, the pressure sensor being the only pressure sensor provided in the apparatus to facilitate the wind speed measurement;

deriving, based on the pressure sensor signal, one or more surface wind speed characteristics that are descriptive of the wind speed at a meteorological measurement height of 10 meters above ground level, said deriving comprising:

deriving a time series of pressure values by sampling the pressure sensor signal to facilitate processing the pressure values as a sequence of time frames, each respective time frame including a predefined number of consecutive pressure values, deriving, for each respective time frame of the sequence of time frames based on a variation of pressure values within the respective time frame, a respective reference wind speed value, thereby obtaining a time series of reference wind speed values, and computing, for each respective time frame of the sequence of time frames, respective one or more surface wind speed characteristics based on the time series of reference wind speed values; and one or more of: (i) displaying the one or more computed surface wind speed characteristics on a display, and (ii) transmitting the one or more computed surface wind speed characteristics to another apparatus.

20. A non-transitory computer-readable medium on which is stored a computer program comprising computer readable program code configured to cause performing of the following when said program code is run on one or more computing apparatuses:

receiving, from a pressure sensor disposed within a measurement volume defined inside a wind shield such that the wind shield is configured to prevent a direct airflow to the pressure sensor from an environment of an apparatus housing the pressure sensor when the apparatus is in an operating position to carry out the wind speed measurement, a pressure sensor signal that is descriptive of an instantaneous atmospheric pressure in ambient air within the measurement volume, the pressure sensor being the only pressure sensor provided in the apparatus to facilitate measuring meteorological surface wind speed;

deriving, based on the pressure sensor signal, one or more surface wind speed characteristics that are descriptive of the wind speed at a meteorological measurement height of 10 meters above ground level, said deriving comprising:

deriving a time series of pressure values by sampling the pressure signal to facilitate sensor processing the pressure values as a sequence of time frames, each respective time frame including a predefined number of consecutive pressure values, deriving, for each respective time frame of the sequence of time frames based on a variation of pressure values within the respective time frame, a respective reference wind speed value, thereby obtaining a time series of reference wind speed values, and computing, for each respective time frame of the sequence of time frames, respective one or more surface wind speed characteristics based on the time series of reference wind speed values; and one or more of: (i) displaying the one or more computed surface wind speed characteristics on a display, and (ii) transmitting the one or more computed surface wind speed characteristics to another apparatus.

* * * * *